United States Patent [19]

Boura

[11] Patent Number: 4,711,128
[45] Date of Patent: Dec. 8, 1987

[54] MICROMACHINED ACCELEROMETER WITH ELECTROSTATIC RETURN

[75] Inventor: André Boura, Chatellerault, France
[73] Assignee: Societe Francaise d'Equipements pour la Aerienne (S.F.E.N.A.), France
[21] Appl. No.: 851,639
[22] Filed: Apr. 14, 1986
[30] Foreign Application Priority Data
Apr. 16, 1985 [FR] France .................. 85 05690
[51] Int. Cl.[4] ............... G01P 15/13; G01P 15/125
[52] U.S. Cl. ............................... 73/517 B; 361/280
[58] Field of Search ................ 73/517 B, 517 R; 361/280

[56] References Cited
U.S. PATENT DOCUMENTS

| | | | |
|---|---|---|---|
| 3,877,313 | 4/1975 | Ferriss | 73/517 B |
| 4,342,227 | 8/1982 | Petersen et al. | 73/517 R |
| 4,345,474 | 8/1982 | Deval | 73/517 B |
| 4,600,934 | 7/1986 | Aine et al. | 73/517 R |

Primary Examiner—John Chapman
Attorney, Agent, or Firm—William A. Drucker

[57] ABSTRACT

An accelerometer is provided using at least one sensor with flat pendular structure formed by micro-machining a fine monocrystal wafer and comprising a flat mobile mass suspended from the rest of the structure by means of two thin parallel strips situated on each side of the mass. The mass comprises at least one mobile capacitor plate disposed between two fixed capacitor plates provided on the fixed part of the structure. The mobile plate is brought to a voltage $V_o$, whereas the fixed plates are respectively brought to voltages $V_1$ and $V_2$ which are capable of generating an electrostatic return force on the mobile mass.

9 Claims, 5 Drawing Figures

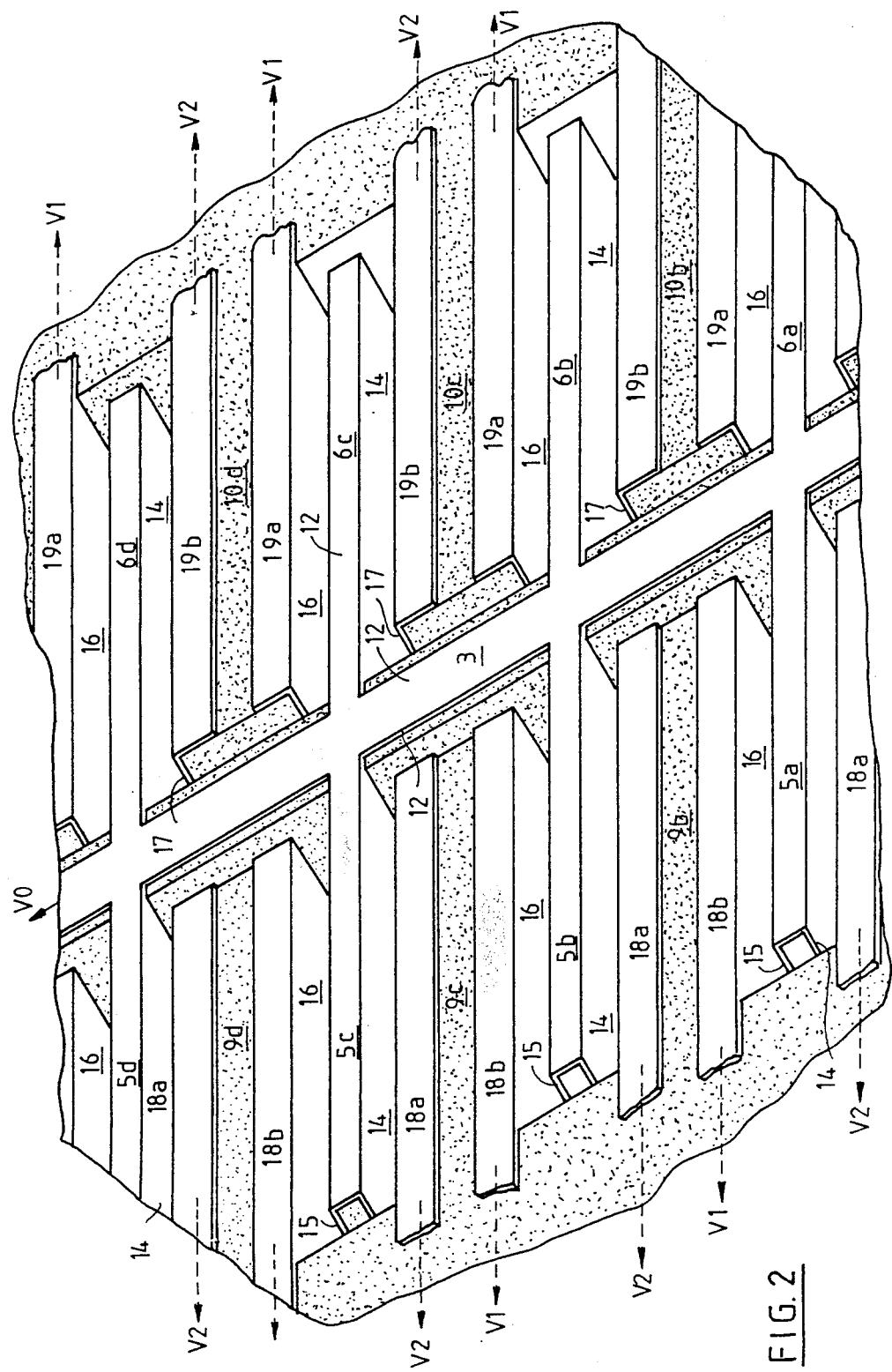

MICROMACHINED ACCELEROMETER WITH ELECTROSTATIC RETURN

BACKGROUND OF THE INVENTION

1. Field of the Invention

The present invention relates to an accelerometer using an accelerometric sensor with flat pendular structure of the type described in U.S. Pat. No. 4,663,972.

2. Description of the Prior Art

It will be recalled that in the above patent this pendular structure is formed by micro-machining a substrate formed by a fine wafer of quartz (or other monocrystal) and by vacuum deposition of judiciously disposed conducting surfaces. It comprises a flat mobile mass (or test body) suspended from the rest of the structure by means of two thin parallel strips situated on each side of said mass.

These suspension strips have for thickness the thickness of the substrate and are extremely narrow. They allow the mobile mass to move in translation in a direction parallel to the plane of the substrate while opposing only a small resilient return force, so that the sensitive axis of the sensor is situated in the plane of the substrate.

These suspension strips carry conductors ensuring the electric continuity between metallized areas connected to the mobile mass and connection zones situated on the fixed part of the substrate.

Furthermore the above patent proposes, for servo-control of the sensor, a return motor using Laplace's force obtained by the action of a magnetic induction on a current flowing in at least one coil printed on one of the faces of the mobile mass.

It is clear that this solution, apart from the fact that it requires the formation of the coil, uses a magnetic circuit usually comprising a permanent magnet associated with pole pieces situated on one side of the mobile mass, in line with the coil, and a flux relooping plate disposed on the other side of said mass. In addition, it is necessary to provide delicate connections between the coil and the connection areas or the electronic circuits situated on the fixed part of the pendular structure, these connections being formed by conducting layers disposed on the suspension strips.

The aim of the invention is more particularly to provide an accelerometer comprising an accelerometric sensor of a type similar to the one described above, but using motorization and servo-control means of a type more appropriate for obtaining a simplified construction of the assembly, which is less space consuming and less costly, and which allows a very high degree of miniaturization.

SUMMARY OF THE INVENTION

For this, the accelerometer of the invention comprises an accelerometric sensor of the above type, in which the mobile mass comprises at least one mobile capacitor plate and the fixed part of the pendular element comprises two fixed capacitor plates disposed on each side of the mobile plate. The mobile plate is then brought to a voltage $V_0$, whereas the fixed plates are respectively brought to voltages $V_1$ and $V_2$ capable of generating, on said mobile mass, an electrostatic return force of the form:

$$F_R = \frac{\epsilon_0}{2} S \left[ \frac{(V_1 - V_0)^2}{(e - x)^2} - \frac{(V_2 - V_0)^2}{(e + x)^2} \right]$$

in which formula:
 $\epsilon_0$ is the dielectric constant,
 S is the surface facing the plates,
 e is the mean distance between the mobile plate and the fixed plates,
 X is the relative movement of the mobile mass.

From the above described structure, the acceleration detected by the accelerometric sensor may be measured using one of the two following solutions:

The first solution consists in controlling the deviations $(V_1-V_0)$ and $(V_2-V_0)$ so that:

$$V_1 - V_0 = k(e-x)$$

$$V_2 - V_0 = k(e+x)$$

k being a coefficient of constant value resulting from an adjustment, and in measuring the voltage deviation $V_2-V_1$ which is proportional to the positional deviation of the mobile mass, and, consequently, to the apparent acceleration under permanent working conditions.

The second solution consists in controlling the position of the mobile mass, using the voltages $V_0$, $V_1$ and $V_2$ and measuring the return force $F_R$ required.

BRIEF DESCRIPTION OF THE DRAWINGS

Embodiments of the invention will be described hereafter by way of non limitative examples with reference to the accompanying drawings in which:

FIG. 2 is a partial perspective view on a larger scale of the accelerometric sensor of FIG. 1, in which the detail of the metallizations has been shown;

DESCRIPTION OF THE PREFERRED EMBODIMENTS

Figure 1:
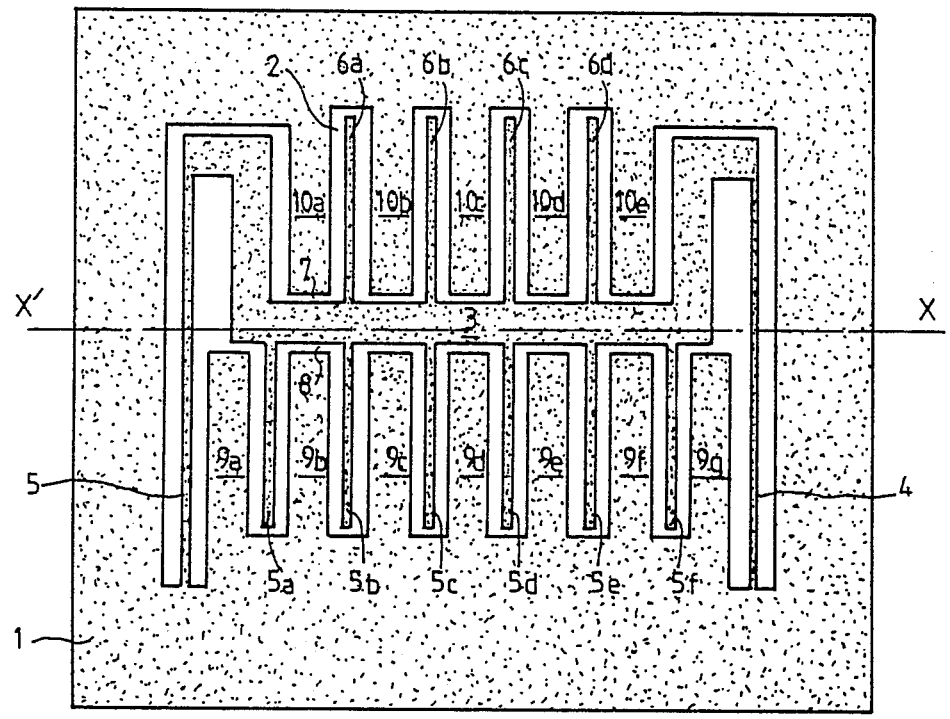
FIG. 1 is a general diagram of the structure of an accelerometric sensor in accordance with the invention.

Such as shown in FIG. 1, the accelerometric sensor is formed from a substrate consisting of a fine wafer 1 or a monocrystal, such as quartz, inside which cut-outs 2 have been formed defining a mobile mass formed by a carrier beam 3 suspended resiliently from the rest of the wafer 1 by two thin strips 4, 5 which have the same thickness as the substrate and are relatively narrow.

This beam 3 may therefore move in translation along a sensitive axis X'X perpendicular to the thin strips 4, 5. Furthermore, it comprises a succession of detection and return teeth 5a to 5f and 6a to 6d which extend perpendicularly to the sensitive axis X'X from its two longitudinal edges 7, 8. These teeth engage in recesses of substantially complementary shapes in the fixed part of the substrate, which define a succession of fixed teeth 9a to 9g and 10a to 10e which are inserted between the mobile teeth 5a to 5f and 6a to 6d of beam 3.

The edges of the mobile teeth 5a to 5f and 6a to 6d which are metallized form, with the edges of the fixed teeth 9a to 9g and 10a to 10e, which are also metallized, capacities whose air gap varies directly with the relative movement of the carrier beam 3 (some increasing whereas the others decrease and vice versa)

FIG. 2 shows the detail of the metallizations formed on the accelerometric sensor. In this example, the carrier beam is coated, at least on one of its lateral faces, with a conducting layer 12 which also extends over the corresponding lateral face of the teeth 5a to 5f and 6a to 6d.

In a way similar to that described in U.S. Pat. No. 4,663,972 this conducting layer 12 is connected electrically to connection areas provided on the fixed part of the substrate, by means of conducting layers formed on the thin faces of the flexible strips 4, 5.

Moreover, the edges of the mobile teeth are covered by metallizations 14, 15 which extend the conducting layer 12 at right angles.

The edges of the fixed teeth each have a metallization 16, 17 forming a flat capacitor with the metallization 14, 15 of the edge of a facing mobile tooth.

Figure 3:
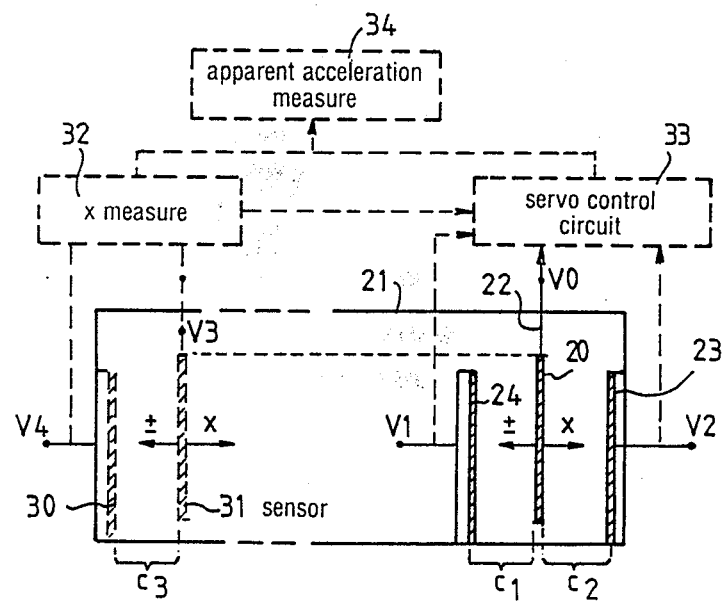
FIG. 3 is an electric diagram for illustrating the operating principle of the accelerometer of the invention.

This metallization comes slightly back onto at least one of the lateral faces of the tooth thus forming a connection area 18a, 18b-19a, 19b which extends over the fixed part of the substrate where it may be connected to the electronic circuit of the accelerometer. Through its metallizations, each of the mobile teeth 5a to 5f, 6a to 6d forms, with the metallized edges 16, 17 of the two fixed teeth 9a to 9g, 10a to 10e which faces it, a double capacitor whose electric diagram is shown in FIG. 3.

In this Figure there has simply been shown a mobile plate 20 suspended inside a case 21 by means of a suspension device 22 and, on each side of and at equal distances from this mobile plate 20, two fixed plates 23, 24. The fixed plate 20 corresponds to the metallized edges 14, 15 of the teeth carried by beam 3, whereas the two fixed plates 24, 25 correspond to the metallizations 16, 17 of the edges of the teeth 9a to 9g, 10a to 10e formed in the fixed part of the substrate.

The capacities of the two capacitors $C_1$ and $C_2$ formed by the mobile plate 20 and the two fixed plates 23, 24 are given by the relationships:

$$C_1 = \frac{C_0}{1 - \frac{x}{e}}$$

$$C_2 = \frac{C_0}{1 + \frac{x}{e}}$$

in which
e is the mean air gap of the two capacitors,
x is the relative movement of the mobile plate,
$C_0$ is the value of the capacity of the two capacitors for $x=0$.

It is clear first of all that by measuring the capacity $C_1$ or $C_2$ it is possible to readily obtain the value of the movement x.

Moreover, the return force $F_R$ obtained by applying a voltage $V_0$ to the mobile plate 20, a voltage $V_1$ to the fixed plate 24 and a voltage $V_2$ to the fixed plate 23 is obtained by the relationship:

$$F_R = \frac{\epsilon_0}{2} S \left[ \frac{(V_1 - V_0)^2}{(e - x)^2} - \frac{(V_2 - V_0)^2}{(e + x)^2} \right]$$

in which $\epsilon_0$ is the dielectric constant and S is the area of the facing metallizations.

As mentioned above, using such a structure the acceleration may be measured according to the two following solutions: the first solution consists in controlling the voltages $V_1 - V_0$ and $V_2 - V_0$, so that:

$$V_1 - V_0 = k(e-x)$$

$$V_2 - V_0 = k(e+k)$$

In this case, the return force created by the voltages $V_0$, $V_1$ and $V_2$ is zero and the deviation $V_2 - V_1$ is proportional to the positional deviation of the mobile mass 20. Since this positional deviation is proportional to the apparent acceleration, this acceleration is therefore measured in an open loop.

The second solution consists in controlling the position of the mobile mass, using the voltages $V_0$, $V_1$, $V_2$. The force $F_R$ required is then proportional to the apparent acceleration. A means of measuring it is to control $V_0$ and $V_2$ with $$V_0 = \text{constant}$$

$$V_2 = -V_1$$

which gives:

$$F_R = K V_1 V_0 = K' V_1$$

K being a constant and $K' = KV_0$

The measurement in this case depends no longer on the elasticity of the substrate. In practice, either two independent capacity systems must be used, one for detecting the position by capacitive measurement, the other for the return, or voltages $V_i$ must be used comprising a DC component responsable for the return and an AC component of low amplitude or of controlled amplitude for position detection.

Thus, in FIG. 3, there has also been shown with broken lines an independent capacity system comprising a fixed plate 30 and a mobile plate 31 interlocked for movement with plate 20.

Plates 30 and 31 are respectively brought to voltages $V_3$, $V_4$ and are connected to a block 32 for measuring the movements x. Similarly, the plates $V_1$, $V_2$ and $V_0$ are connected to a servo-control circuit (block 33). The two blocks 32 and 33 are themselves connected to a circuit for measuring the apparent acceleration (block 34).

Figure 4:
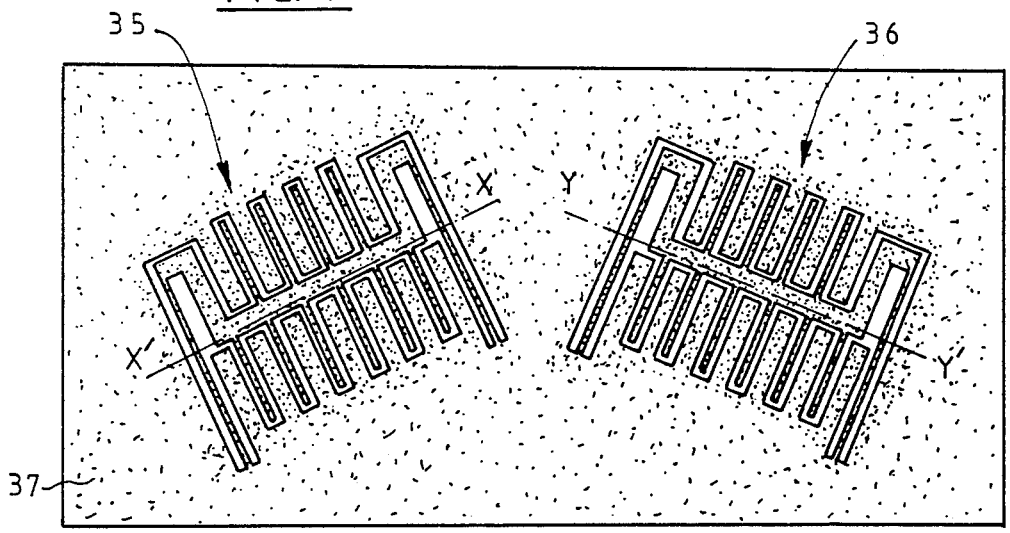
FIG. 4 is a schematical view of a two axis accelerometer or inclinometer formed by using two accelerometric sensors of the type shown in FIG. 1, machined on the same substrate.

It is advantageous, for reasons of cost, performance, and space saving, to machine simultaneously two detection structures 35, 36 on the same substrate 37. The angular relative setting of the two sensitive axes in the plane of the substrate is then particularly stable with regard to the temperature. In the case of Z cut α quartz the structure of the crystal is used in the arrangement (FIG. 4) where the two sensitive axes XX', YY' form therebetween an angle of 120°. Two weighted sums of the outputs of each structure then give apparent accelerations along two orthogonal axes contained in the plane of the substrate.

Figure 5:
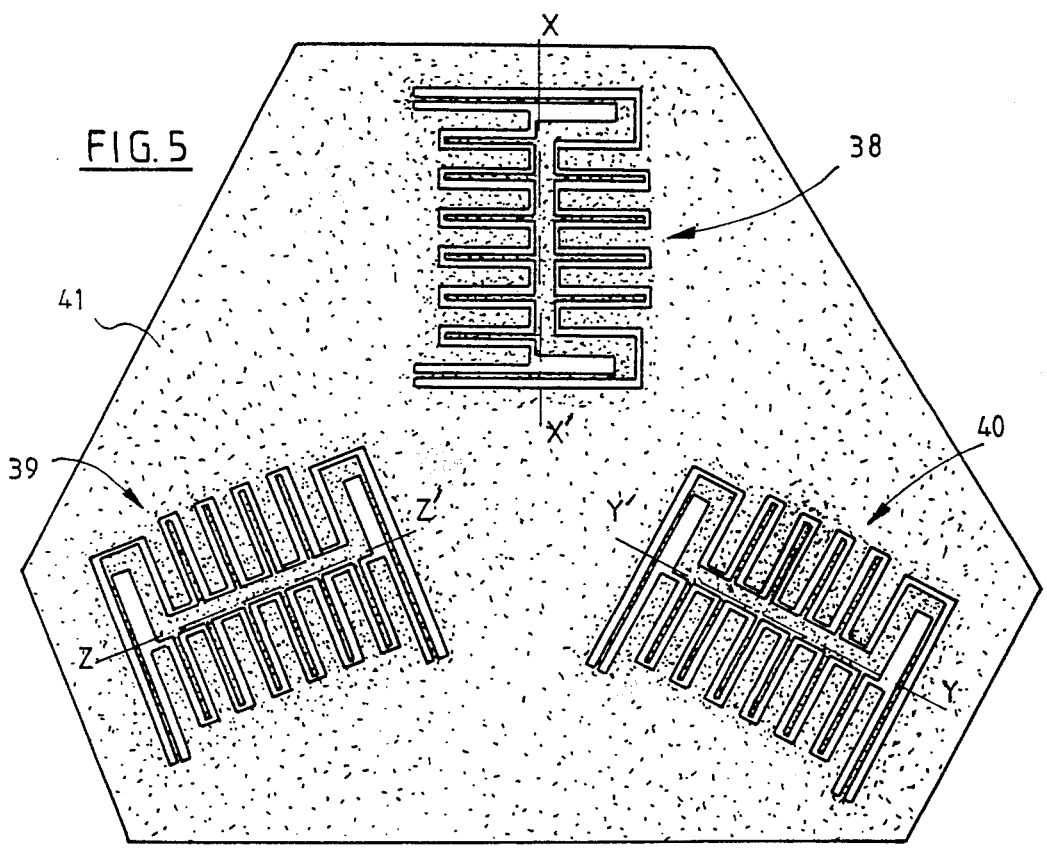
FIG. 5 is the diagram of another embodiment of a two axis accelerometer using three accelerometric sensors.

Furthermore, still in the particular case where α quartz is used, the image of three structures 38, 39, 40 having sensitive axes X, X'-Y, Y'-Z, Z' at 120° from each other in the same substrate (FIG. 5) allows a redundance to be obtained improving the reliablity and functional testability at the cost of a slight increase in bulk.

Such a structure is particularly well adapted to applications of the inclinometer type in which it is required to measure the components of the apparent acceleration in a given plane.

What is claimed is:

1. An accelerometer sensor comprising a flat pendular structure made from one and the same crystalline wafer, said structure having in a same plane, a flat fixed part, at least two parallel blades flexible in the same plane and delimiting therebetween a space, each of said blades having a first end portion fixedly connected to said fixed part, and a second end portion, said structure further comprising a flat test body connected to the second end portions of said blades so as to be suspended from the flat fixed part and to be able to move in translation in the same plane along a sensitive axis under the effect of an acceleration with a position which varies in relation with said acceleration, said flat test body extending at least partially into said space, wherein said flat test body comprises at least a first edge which carries a first metallization having first and second opposite faces and said flat fixed part comprises at least a second and a third edge carrying respectively a second and a third metallizations, said second and third metallizations respectively facing said first and second opposite faces, so as to form two capacitors whose capacities vary depending on the position of said test body, said first metallization being brought to a first voltage $V_0$, whereas the second and the third metallizations are respectively brought to a second and third voltages $V_1$ and $V_2$ which are capable of generating an electrostatic return force on the flat test body.

2. The accelerometer as claimed in claim 1, further comprising:

means for servo controlling the difference between the second and the first voltages and the difference between the third and the first voltages so that:

$$V_1 - V_0 = k(e - x)$$

$$V_2 - V_0 = k(e + x)$$

in which expressions e is a mean distance between the first metallization and the second and third metallizations, x represents a relative movement of the flat test body and k is a constant value, and means for measuring a voltage difference $(V_2 - V_1)$ between said third and said second voltages, which is proportional to a variation of position of the flat test body, and, consequently, to an apparent acceleration under permanent operating conditions.

3. The accelerometer as claimed in claim 1, further comprising means for servo controlling the position of the flat test body by means of the said first, second and third voltages and for measuring a required return force $F_R$ which is proportional to the acceleration.

4. The accelerometer as claimed in claim 1, which further comprises an independent capacity comprising at least a fourth metallization provided on an additional edge of the flat fixed part and a fifth metallization provided on an edge of the flat test body, said independent capacity being connected to means for detecting the position of the said flat test body.

5. The accelerometer as claimed in claim 1, wherein said first, second and third voltages $V_0$, $V_1$, $V_2$, comprise a DC component for generating the said return force and an AC component for detecting the position of the said flat test body.

6. The accelorometer as claimed in claim 1, wherein the said flat test body comprises a carrier beam which carries at least a first succession of teeth having metallized edge portions which engage in recesses of substantially complementary shapes formed in the flat fixed part which define a second succession of teeth having metallized edge portions inserted between the teeth of the first succession, the metallized edge portions of the first succession of teeth forming with the metallized edge portions of the second succession of teeth, capacities whose value varies directly with a relative movement of the carrier beam.

7. The accelerometer as claimed in claim 1, which comprises on a same flat fixed part two flat test bodies, each being suspended on said flat fixed part by two parallel blades, said flat test bodies having two respective sensitive axes which form an angle of 120° with respect to each other.

8. The accelerometer as claimed in claim 1, which comprises on a same flat fixed part, three test bodies, each being suspended on said flat fixed part by two parallel blades, said flat test bodies having three respective sensitive axes forming therebetween angles of 120°.

9. The accelerometer as claimed in claim 1, wherein said crystalline wafer is made from Z cut α quartz.

* * * * *